(12) United States Patent
Jaramillo (10) Patent No.: US 12,505,057 B2
(45) Date of Patent: Dec. 23, 2025

(54) APPARATUS AND METHOD FOR DETERMINING A DISCONNECTION OF A DEVICE FROM A BUS

(71) Applicant: NXP USA, Inc., Austin, TX (US)

(72) Inventor: Kenneth Jaramillo, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 64 days.

(21) Appl. No.: 17/934,751

(22) Filed: Sep. 23, 2022

(65) Prior Publication Data

US 2024/0104040 A1  Mar. 28, 2024

(51) Int. Cl.
*G06F 13/38* (2006.01)
*G06F 13/366* (2006.01)
*G06F 13/40* (2006.01)

(52) U.S. Cl.
CPC .......... *G06F 13/385* (2013.01); *G06F 13/366* (2013.01); *G06F 13/4077* (2013.01)

(58) Field of Classification Search
None
See application file for complete search history.

(56) References Cited

U.S. PATENT DOCUMENTS

| | | | | |
|---|---|---|---|---|
| 6,279,060 B1* | 8/2001 | Luke | ..................... | G06F 13/385 710/10 |
| 6,415,342 B1* | 7/2002 | Wahl | ................... | G06F 13/4072 710/72 |
| 7,142,563 B1* | 11/2006 | Lin | ..................... | H04L 47/2441 370/469 |
| 7,180,855 B1* | 2/2007 | Lin | ....................... | H04L 47/805 370/395.21 |
| 7,188,202 B1* | 3/2007 | Dorr | ..................... | G06F 13/366 710/316 |
| 9,219,463 B2 | 12/2015 | Chen | | |
| 9,483,435 B2 | 11/2016 | Dixit et al. | | |
| 10,014,957 B2 | 7/2018 | Maung et al. | | |
| 2003/0076842 A1* | 4/2003 | Johansson | ............... | H04L 41/00 370/386 |
| 2008/0059661 A1* | 3/2008 | Akahane | ............. | G06F 13/4081 710/18 |
| 2014/0006652 A1* | 1/2014 | Chen | ..................... | G06F 13/385 710/16 |
| 2014/0006655 A1* | 1/2014 | Chan | ................... | G06F 13/4282 710/16 |

(Continued)

OTHER PUBLICATIONS

Salih, S.M.; "Novel Sliding Window Technique of OFDM Modem for Physical Layer of IEEE 802.11a Standard"; Journal of Telecommunications, vol. 3, Issue 1; Jun. 2010; 6 pages.

(Continued)

*Primary Examiner* — Steven G Snyder
*Assistant Examiner* — Aurangzeb Hassan (57) ABSTRACT

An apparatus for determining a disconnection of a device from a bus, the apparatus comprising: a detection unit configured to periodically poll the bus, to detect an occurrence of an indicator of disconnection; and a handling unit configured to, in response to detecting the occurrence of an indicator of disconnection a predetermined number of times within a predetermined interval, make a determination that the device is disconnected from the bus. A method for determining a disconnection of a device from a bus is also presented.

22 Claims, 10 Drawing Sheets

(56) References Cited

U.S. PATENT DOCUMENTS

| | | | | |
|---|---|---|---|---|
| 2014/0006664 | A1* | 1/2014 | Chen .................. | G06F 13/4072 |
| | | | | 710/106 |
| 2015/0309953 | A1* | 10/2015 | Steele ................ | G06F 11/3051 |
| | | | | 710/316 |
| 2016/0285757 | A1* | 9/2016 | Srivastava ............ | H04L 45/566 |
| 2019/0004590 | A1* | 1/2019 | Srivastava .......... | G06F 13/4022 |
| 2019/0018802 | A1* | 1/2019 | Chellappan ......... | G06F 13/4282 |
| 2020/0311007 | A1* | 10/2020 | Muto ................. | G06F 13/4081 |
| 2021/0029036 | A1* | 1/2021 | Ghanwani ........... | H04L 12/4641 |
| 2022/0206983 | A1* | 6/2022 | Erdogan ............. | G06F 13/4282 |

OTHER PUBLICATIONS

Wang, L.; "Detection of Man-in-the-middle Attacks Using Physical Layer Wireless Security Techniques"; Worcester Polytechnic Institute; Aug. 27, 2013; 105 pages.

* cited by examiner

APPARATUS AND METHOD FOR DETERMINING A DISCONNECTION OF A DEVICE FROM A BUS

BACKGROUND

The present invention relates to an apparatus and a method for determining a disconnection of a device from a bus.

In telecommunication and data transmission, serial communication is the process of sending data one bit at a time, sequentially, over a communication channel or computer bus. Serial digital communication protocols are generally layered. In the OSI (Open System Interconnection) reference model, the communications between computing systems or between subsystems of a single computing system are split into as many as seven different functional layers: Physical, Data Link, Network, Transport, Session, Presentation, and Application. While originally developed in the 1970s to describe inter-system computer networks, the layered model, and especially the lower layers of this model, have been increasingly applied to intra-system interfaces, including serial buses and Networks on Chips (NoCs).

Each layer of the OSI model provides a set of functions within the overall set of functionalities required for the communication or interface protocol. Physical Layer is responsible for the transmission and reception of unstructured raw data between a device, such as an interface controller, hub, or switch, and a physical transmission medium. Physical Layer converts the digital bits to and from electrical, radio, or optical signals. Data Link layer provides transfer of data units (often in packet form) between pairs of entities connected to the medium by Physical Layer interfaces. Link Layer detects and possibly corrects errors that may occur in the physical data transfer, and may provide addressing and perform arbitration of access, especially for protocols where the physical medium is shared between a plurality of transceivers. Link Layer also defines the protocol to establish and terminate a connection between pairs of physically connected devices, and the protocol for flow control between them.

Physical Layer (PHY) is most closely associated with the physical connection between devices. Physical Layer specifies how encoding occurs over a physical signal, such as electrical voltage or a light pulse. For example, a 1 bit might be represented on a copper wire by the transition from a 0-volt to a 5-volt signal, whereas a 0 bit might be represented by the transition from a 5-volt signal to a 0-volt signal. Within a physical layer, protocol information, which is a superset of link-layer data units, can be conveyed in at least three ways: (a) by digital values encoded in the symbols of the PHY signaling scheme, (b) by electrical (or optical, etc.) signals or signal patterns that differ from the defined symbol encoding, and/or (c) by temporal or sequential patterns that either conform to or violate the patterns defined for the particular communication protocol. Physical Layer may be implemented by a PHY chip. For example, for Universal Serial Bus (USB), a PHY chip is present within most USB controllers in hosts or embedded systems and includes the transceiver circuits needed between the digital and modulated (analog) parts of the interface.

Common problems occurring at Physical Layer are often related to incorrect media termination, EMI or noise scrambling, and interfaces and/or hubs that are misconfigured or do not work correctly. More specifically, noise or other disturbances to the physical interconnection may cause temporary effects that may erroneously appear to the PHY interface. Considering device disconnect detection during USB 2.0 High Speed mode, one example is noise introduced by an audio link. It might be such that a user playing USB 2.0 high-speed audio caused a false disconnect condition to occur. If the system were to act upon it, the user's audio would be interrupted for quite some time while the USB Host deals with the false disconnection and reestablishes the USB link and USB audio. Another example is spurious state transition caused by sporadic disconnects when users wiggle the USB 2.0 cable around, temporarily breaking the physical circuit. These would not provide satisfactory user experiences.

Therefore, a technique is needed to provide more robust discrimination of actual device disconnect events from these temporary/transient instances for Physical Layer.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one aspect, there is provided an apparatus for determining a disconnection of a device from a bus, the apparatus comprising: a detection unit configured to periodically poll the bus, to detect an occurrence of an indicator of disconnection; and a handling unit configured to, in response to detecting the occurrence of an indicator of disconnection a predetermined number of times within a predetermined interval, make a determination that the device is disconnected from the bus.

In another aspect, there is provided a method for determining a disconnection of a device from a bus, the method comprising: periodically polling the bus, to detect an occurrence of an indicator of disconnection; and in response to detecting the occurrence of an indicator of disconnection a predetermined number of times within a predetermined interval, making a determination that the device is disconnected from the bus.

BRIEF DESCRIPTION OF THE DRAWINGS

So that the manner in which the above recited features of the present disclosure can be understood in detail, a more detailed description of the disclosure may be had by reference to embodiments, some of which are illustrated in the appended drawings. The appended drawings illustrate only typical embodiments of the disclosure and should not limit the scope of the disclosure, as the disclosure may have other equally effective embodiments. The drawings are for facilitating an understanding of the disclosure and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

In most communication protocols, there are defined time periods of relevance. For example, for Bluetooth 4.0 Standard, it takes 708 μs for a 27-byte PDU (protocol data unit) to send out a packet. While for USB 2.0 High Speed microframe, it needs 125 μs to convey a microframe according to the USB 2.0 spec. The host sends a Start-of-Frame (SOF) packet at the beginning of each microframe, and detects potential device disconnects at the end of these packets. Therefore, a USB host can detect a device disconnect at most once every 125 μs.

Embedded USB (eUSB) will be described hereinafter as one example according to which the above mentioned PHY interface is also defined. Disconnect detection method of the embodiments will be further discussed in detail below taking eUSB and corresponding PHY as the example. However, for those skilled in the art, disconnect detection of other Physical Layer signaling events can also be implemented by using the same.

Universal Serial Bus (USB) has been an extreme success in the electronics industry. Multiple derivatives and evolutions have been developed on basis of USB, including USB 2.0, USB 2.0 High Speed mode, and embedded USB (eUSB), etc., that allow serial interconnections for systems. A USB Bus Interface is present at host side (also known as USB Host Controller), or at physical device side, or even at USB cable side. The USB Bus Interface provides physical/signaling/packet connectivity between the host and the physical device. Furthermore, the USB Bus contains data lines and is configured for transferring frames of data from host side to device side via the data lines.

High speed USB, generally USB 2.0 and above devices apply high-speed termination to eliminate reflection of its high-speed signals. During USB 2.0 High Speed mode, disconnect can be detected using the fact that the device not being present means that its high-speed termination is also not present. Therefore, in some embodiments, when a high-speed signal is issued by the host, the lack of termination will cause the USB data lines to double in voltage due to the resulting reflection because of the unterminated line. The doubled voltage can serve as an indicator of disconnection of the device from the USB Bus in USB 2.0 High Speed mode. In some other embodiments, the disconnect of the device from the USB Bus is indicated by an average of a voltage on each of the data lines exceeding a threshold voltage. A method to accomplish disconnect detection is described in the USB 2.0 standard. During the issuance of a Start-of-Frame (SoF) packet, the possible device disconnect is detected during End-of-Packet (EoP) portion of the SoF packet. This particular packet has a longer End-of-Packet timing that allows for a static differential condition to be generated which is long enough to allow the reflection to be received if the device termination is missing. This higher differential voltage is then used to declare a disconnect.

Signaling, or declaring, a disconnect, however, is a drastic event. It causes all USB communication to be stopped and the link to be torn down. USB bus voltage ($V_{bus}$) is usually taken away for a long duration. Reestablishment of a connection typically will require quite some time and will typically involve redriving $V_{bus}$, detecting device connection, debouncing the connection, USB Bus Reset, and re-enumeration of the device.

Figure 1:
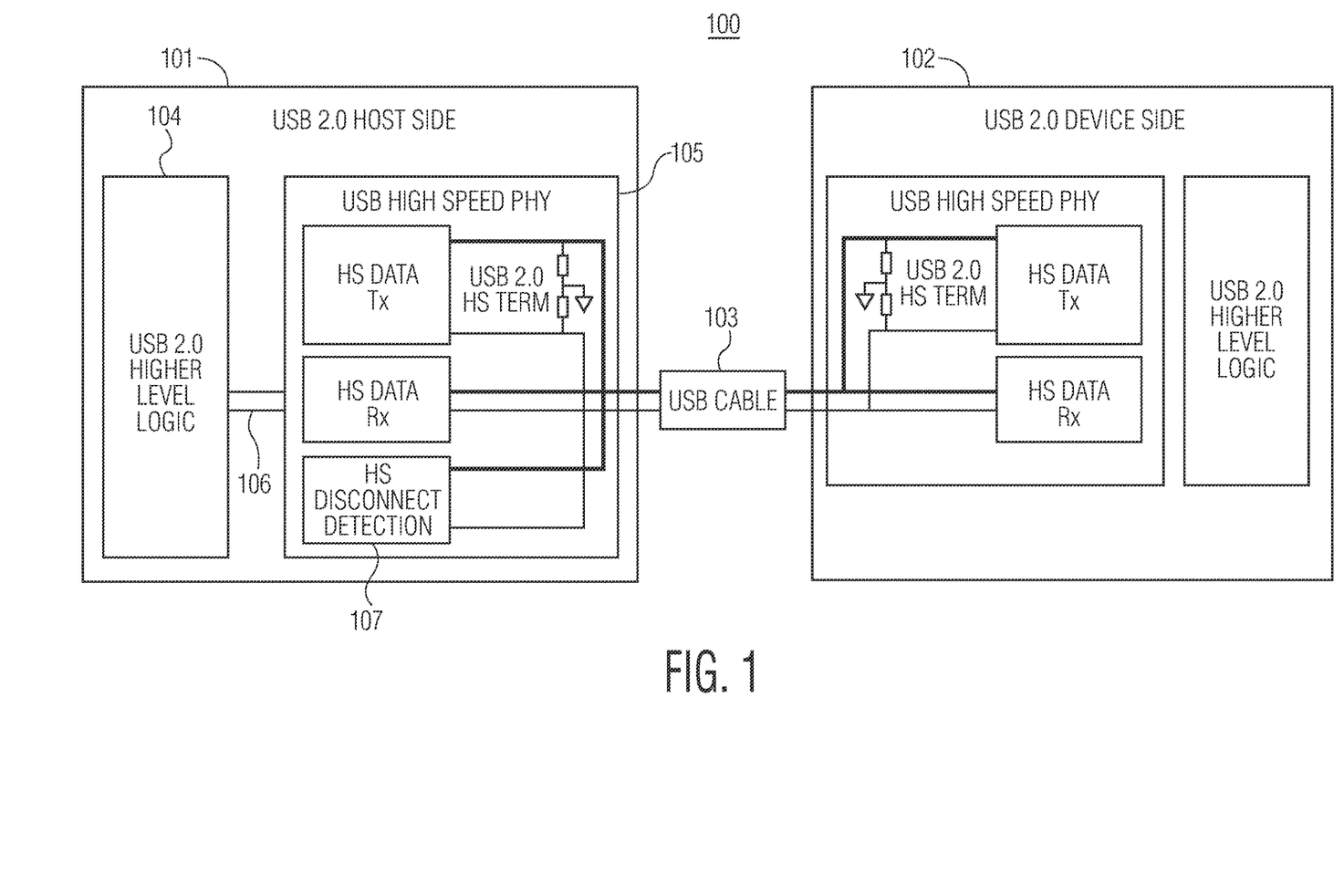
FIG. 1 is a block diagram of a system in which devices are connected for communication in USB 2.0 High Speed mode.

FIG. 1 is a block diagram of a system in which devices are connected for communication in USB 2.0 High Speed mode. FIG. 1 shows a greatly simplified example of the high-speed logic involved in the detection of the high-speed mode disconnect. In the system 100, a USB 2.0 Host Side device 101 and USB 2.0 Device Side device 102 are connected by using a USB cable 103. USB Bus connection is established among the USB 2.0 Host Side device 101, the USB 2.0 Device Side device 102 and the USB cable 103. Communications and data transfers take place via the USB Bus between the USB 2.0 Host Side device 101 and the USB 2.0 Device Side device 102. The frames of data are conveyed through the bus in a Physical Layer. At the USB 2.0 Host Side device 101, higher level logic 104, for example corresponding to high levels of the communication layers according to the OSI model, is responsible for USB packet generation including the Start-of-Frame packets. Lower level logic, corresponding to low levels of the layers and shown in FIG. 1 as USB High Speed PHY 105, transmits the packets. Typical interfaces 106 between the higher level logic 104 and the USB High Speed PHY 105 are UTMI+ (USB 2.0 Transceiver Macrocell Interface), ULPI (UTMI+ Low Pin Interface), and eUSB (embedded USB). A High Speed disconnect detection unit 107 of the USB High Speed PHY 105 detects for conditions indicative of the disconnection during the high-speed mode Start-of-Frame packet and relays information of the detection to the higher level logic 104 via the interfaces 106. The lower level logic is many times referred to as a USB PHY in UTMI and ULPI cases, or an eUSB Repeater in eUSB case. For those skilled in the art, the terms should not be restrictive, as the following embodiments are just referring to wherever the detection of high-speed mode disconnects takes place and how they are conveyed to the system.

In the system 100 shown in FIG. 1, the USB High Speed PHY 105 detects the indicator of disconnection by polling the USB Bus periodically and immediately informs the higher level logic 104 that the USB 2.0 Device Side device 102 is disconnected from the USB Bus once the indicator of disconnection is detected to have occurred, which then takes typical actions based on the disconnection (e.g., removing $V_{bus}$, tearing down the link, etc.). In some embodiments, the bus is polled at least once for each frame of data. However, in real life, there can exist such typical actions even when no actual disconnect occurs between Host Side device 101 and Device Side device 102. System factors may cause false disconnect detection during high speed activity, such as noise introduced by an audio link, or sporadic disconnects when users wiggle the USB 2.0 cable around (this could be due to the use of a defective USB cable, e.g., a non-compliant cable, or due to the user moving the cable during use such that the USB signal becomes very noisy with significant reflections). If the system were to immediately react and perform the typical actions upon disconnect, the user experience can become very poor. Prematurely acting upon what appears to be a disconnect is a drastic reaction as all USB communication is stopped with the link brought down for a significant amount of time before re-connecting the device and USB communication to begin again. The USB 2.0 Standard specifies how to detect a device disconnect during high speed mode. However, it does not specify how it must be handled or acted upon.

One aspect of the proposed solution provides programmable window lengths that vary by increments with the window period derived from particular time intervals of the specific protocol implemented in Physical Layer, and allows the disconnect filtering to be configured to accept up to a certain percentage of false disconnect indications during that time, i.e., the programmable window, before declaring the disconnect detection as valid. Embodiments of the disclosure offer reliable device disconnect detection during times when it may sporadically or temporarily appear that the device has been disconnected. This offers a steadier connection and better user experience even in the presence of noise or other issues occurring in the system.

Figure 2:
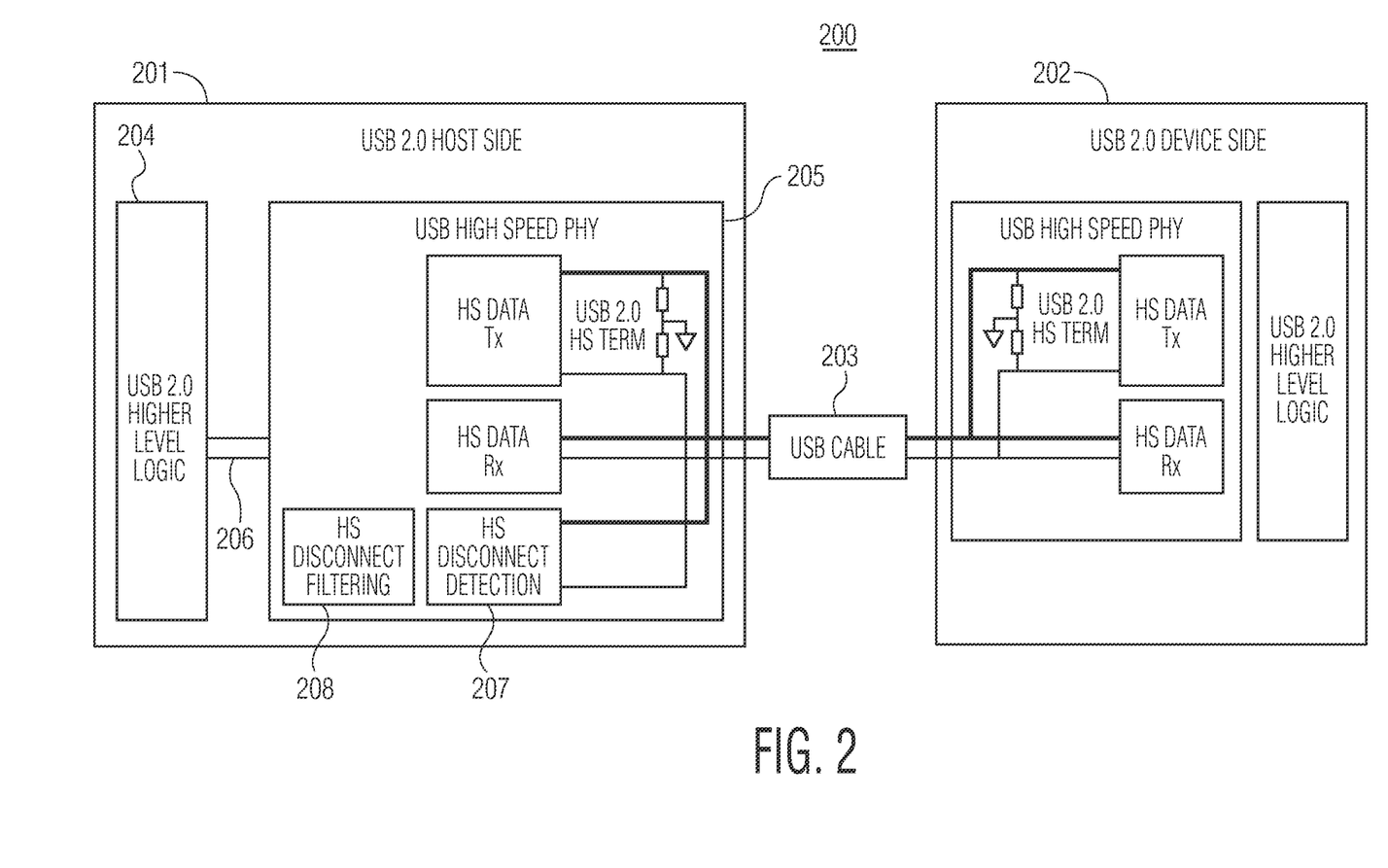
FIG. 2 is a block diagram of an embodiment implemented as a USB 2.0 High Speed mode system in accordance with the present disclosure.

FIG. 2 is a block diagram of an example embodiment implemented as a USB 2.0 High Speed mode system 200 in accordance with the present disclosure. FIG. 2 shows the same example of the high-speed logic involved in the detection of the high-speed mode disconnect as that in FIG. 1 and accordingly labelled with similar references of the USB 2.0 Host Side device 201, USB 2.0 Device Side device 202, USB cable 203, USB 2.0 Higher Level Logic 204, USB High Speed PHY 205, interface 206, and HS disconnect detection 207. The USB High Speed PHY 205 of the embodiment of FIG. 2 includes an additional High Speed disconnect filtering unit 208, for implementing disconnect filtering to the high-speed mode disconnect detection. In this embodiment of FIG. 2, the system 200 has programmable filtering such that sporadic indications of disconnect would be filtered out. Only an actual disconnect condition would be detected and indicted to the higher level logic 204. The corresponding high-speed mode disconnect detection filtering method in accordance with the present disclosure and the architecture of the High Speed disconnect filtering unit will be described in detail below.

In UTMI+ based USP PHY interfaces, there is a status signal to allow the PHY to convey disconnect detection. In eUSB based repeaters, the way in which the high speed disconnect is conveyed is via a repeater issued Port Reset. In either case, the proposed solution of the present disclosure allows that, only after determining that the amount of disconnect detections over a configured window size is above a configured threshold, will the USB PHY act upon this and declare a connected device as being disconnected. Up until that point, any detections of the device being disconnected (during Start-of-Frame packet) will be considered sporadic and ignored.

In some embodiments, the USB Host Side device 201 configures the window length as 3 ms (which corresponds to 24 USB 2.0 High Speed microframes) and the allowed number of sporadic disconnect indications to be 9. If the USB High Speed PHY 205 detects less than (or equal to) 9 indications of disconnect during the 3 ms window length, it ignores the disconnect indications and does not alert the system that there was an actual disconnect needed to be acted upon. However, if the USB High Speed PHY 205 detects 10 or more disconnects within this 3 ms window length, it declares the USB 2.0 Device Side device 202 as now disconnected and alerts the system in whichever way is appropriate to the interface used (e.g., UTMI+, ULPI, eUSB, etc.). Thus, in this illustrative example, the system 200 assumes that given current conditions in a 3 ms window length, the expected noise may cause sporadic disconnect indications up to 37.5% of the time. The filtering method according to an embodiment should allow this and not declare a disconnect. If the detected disconnect indications are more than that allowed number within the window, it means that the Device Side device 202 is probably actually disconnected and so the system 200 should act upon it.

The windows defined may be sliding windows or fixed rolling windows, the difference between which will be explained in detail further below. The present disclosure will mainly discuss implementations using fixed rolling windows, but those skilled in the art will be able to use sliding windows to replace of fixed rolling windows to reproduce the present disclosure.

Figure 3:
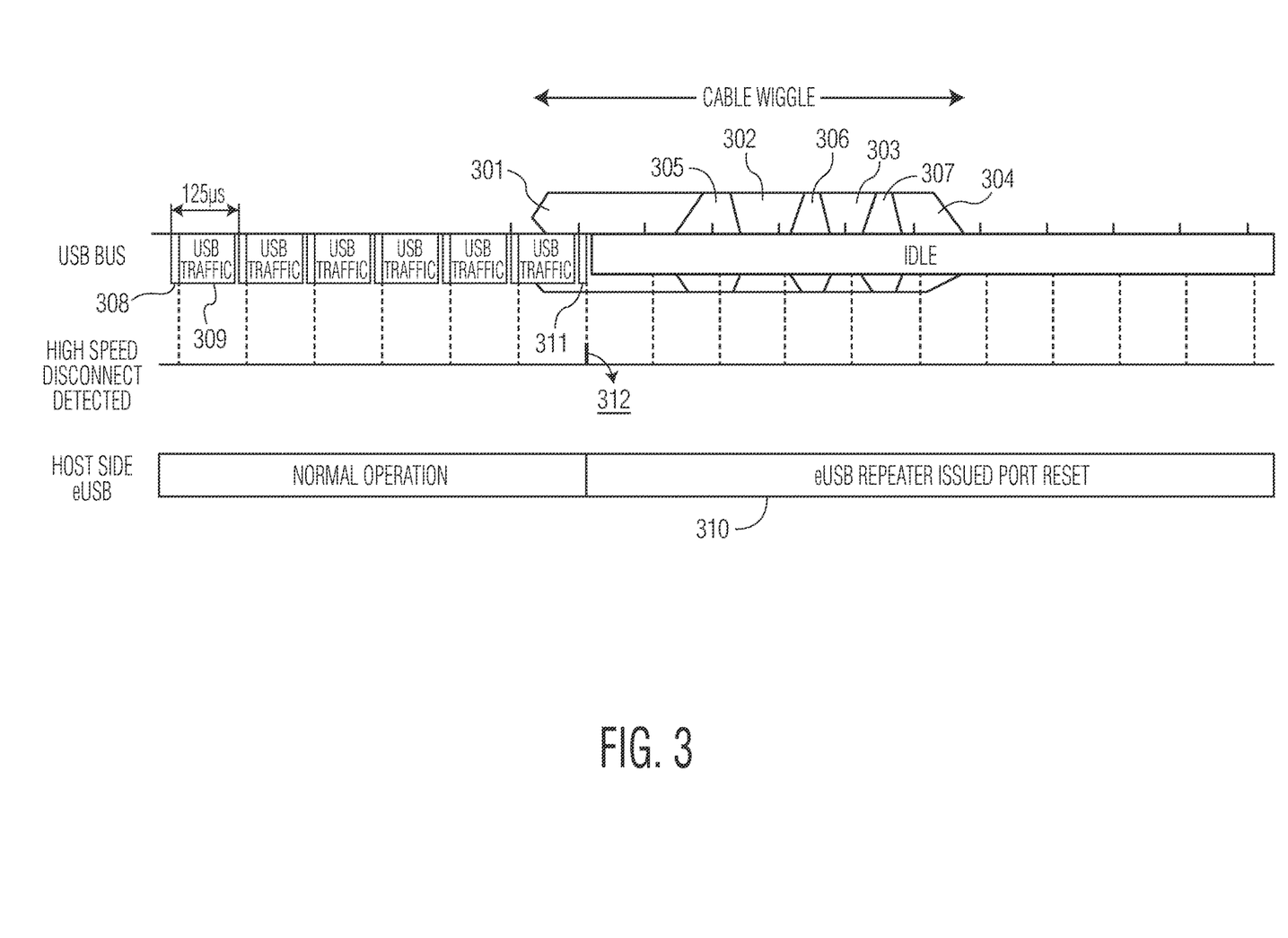
FIG. 3 is a schematic timing diagram of sporadic device disconnect indications without using the proposed filtering solution.

FIG. 3 is a schematic timing diagram of sporadic device disconnect indications without using the proposed filtering solution. FIG. 3 shows an example of an eUSB based USB Host Controller solution where high-speed traffic is occurring while a user wiggles the cable. This is a potential use case where user may get sporadic disconnect indications. The timing sequence shown in FIG. 3 would look very similar, from a high-speed mode disconnect standpoint, to one where high-speed audio playing causes noise. As will be appreciated, noise introduced by other events could also cause such sporadic disconnect indications.

With the example shown in FIG. 3, the eUSB repeater immediately indicates disconnect (by issuing eUSB Port Reset 310) the first time a disconnect is detected. FIG. 3 shows the signals through the USB bus at the top row line. Each USB 2.0 High Speed microframe is consist of a Start-of-Frame packet 308 and a normal USB traffic (Isochronous, Interrupt, Control, Bulk) frame 309. The duration of each microframe is 125 μs. When a user wiggles a USB cable around, the cable will sometimes be plugged and sometimes be unplugged. This will cause a sporadic disconnect on the USB cable. Note that the cable (and hence the connected device) appears connected in periods 305, 306, 307 and the cable (and hence the connected device) appears disconnected in periods 301, 302, 303, 304.

Note that immediately after the very first Start-of-Frame packet 311 occurring while the device appears disconnected in period 301 (i.e., a high speed disconnect 312 is detected during End-of-Packet portion of the SOF packet 311), the eUSB repeater declares the device disconnected, issues a port reset 310 back to the USB host controller, and the USB link is broken. No more USB Traffic is passed through the repeater.

Figure 4:
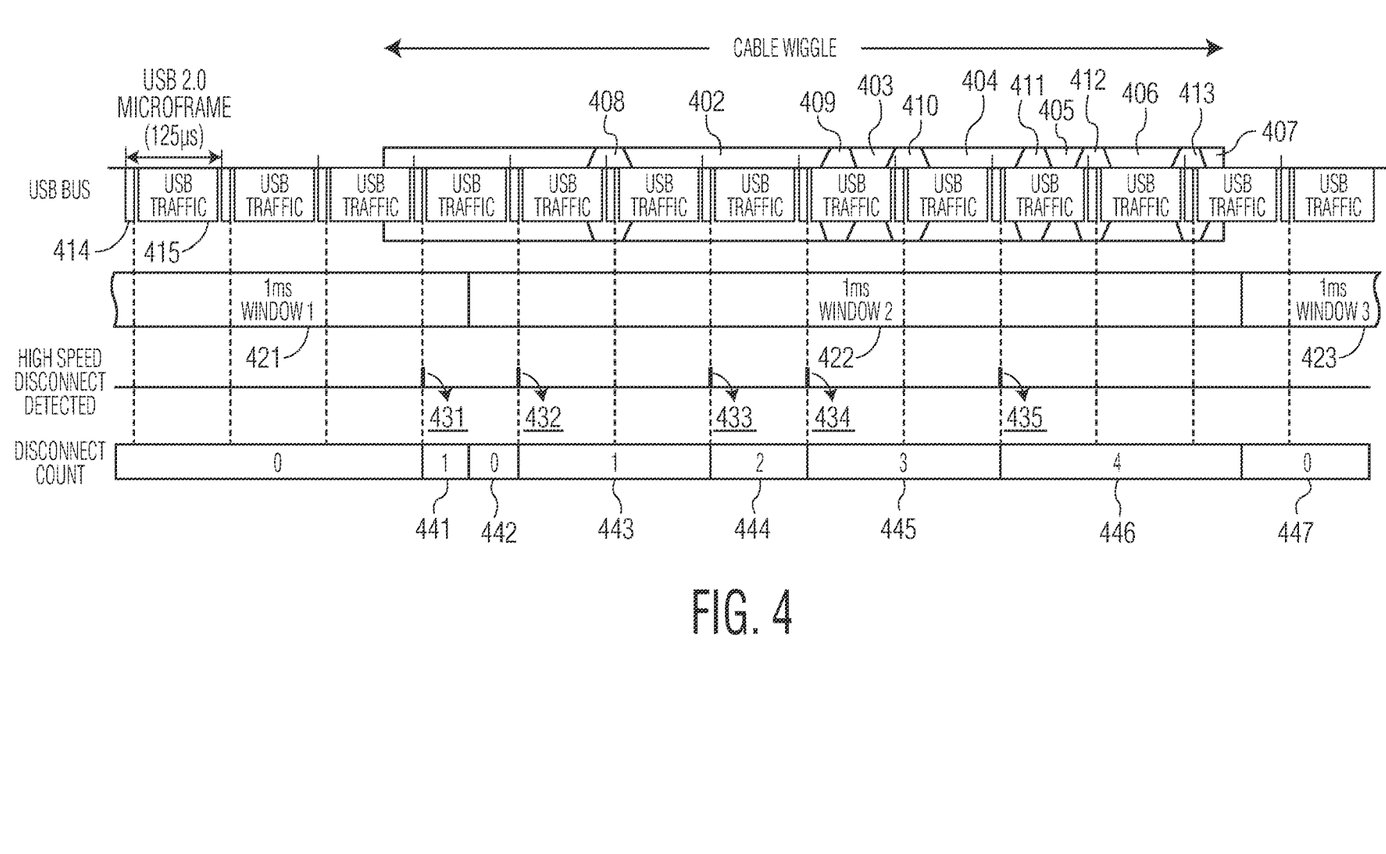
FIGS. 4, 5 and 6 are schematic diagrams of sporadic device disconnect indications by using the proposed filtering solution of the disclosure.
Figure 5:
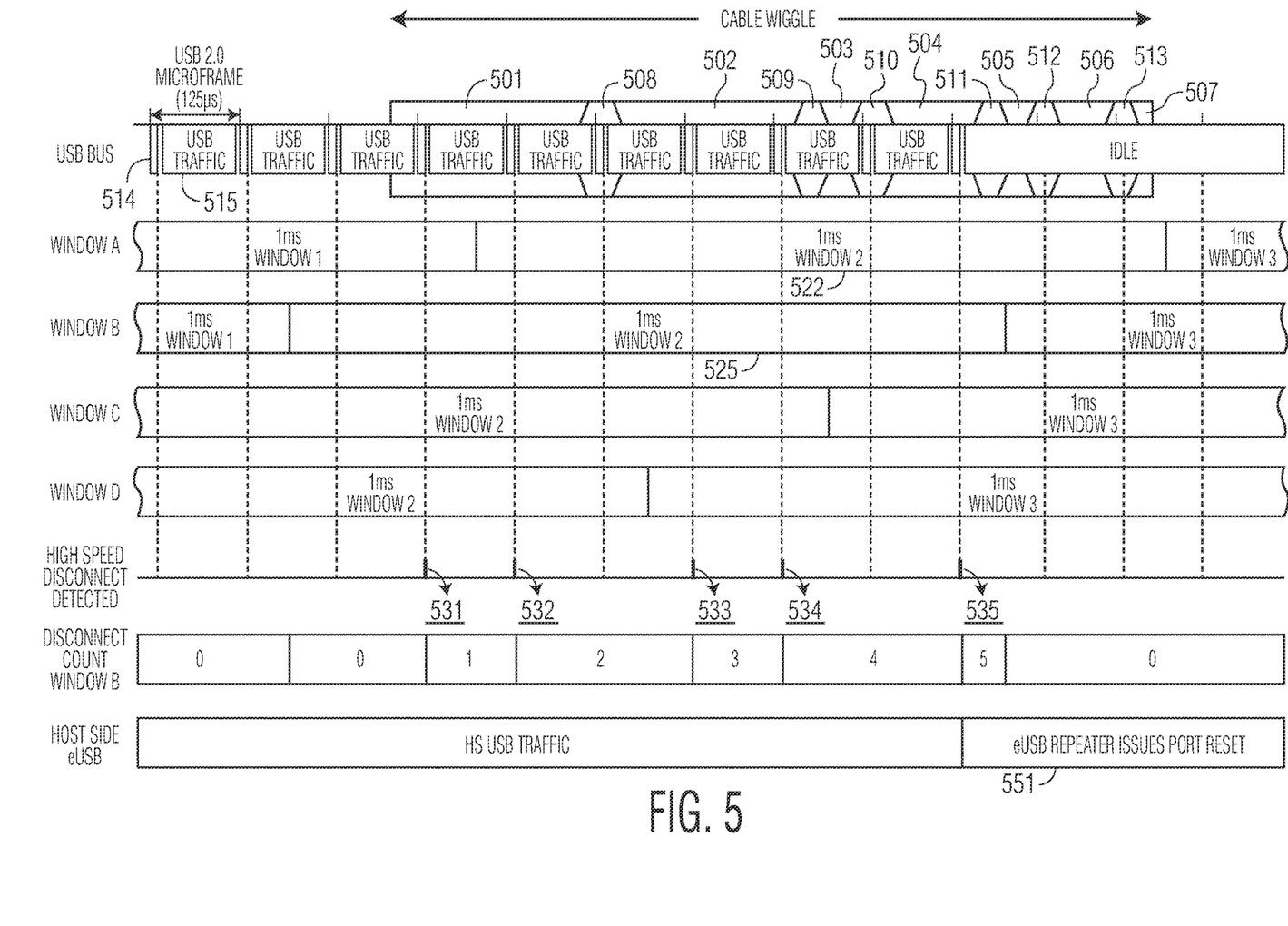
Figure 6:
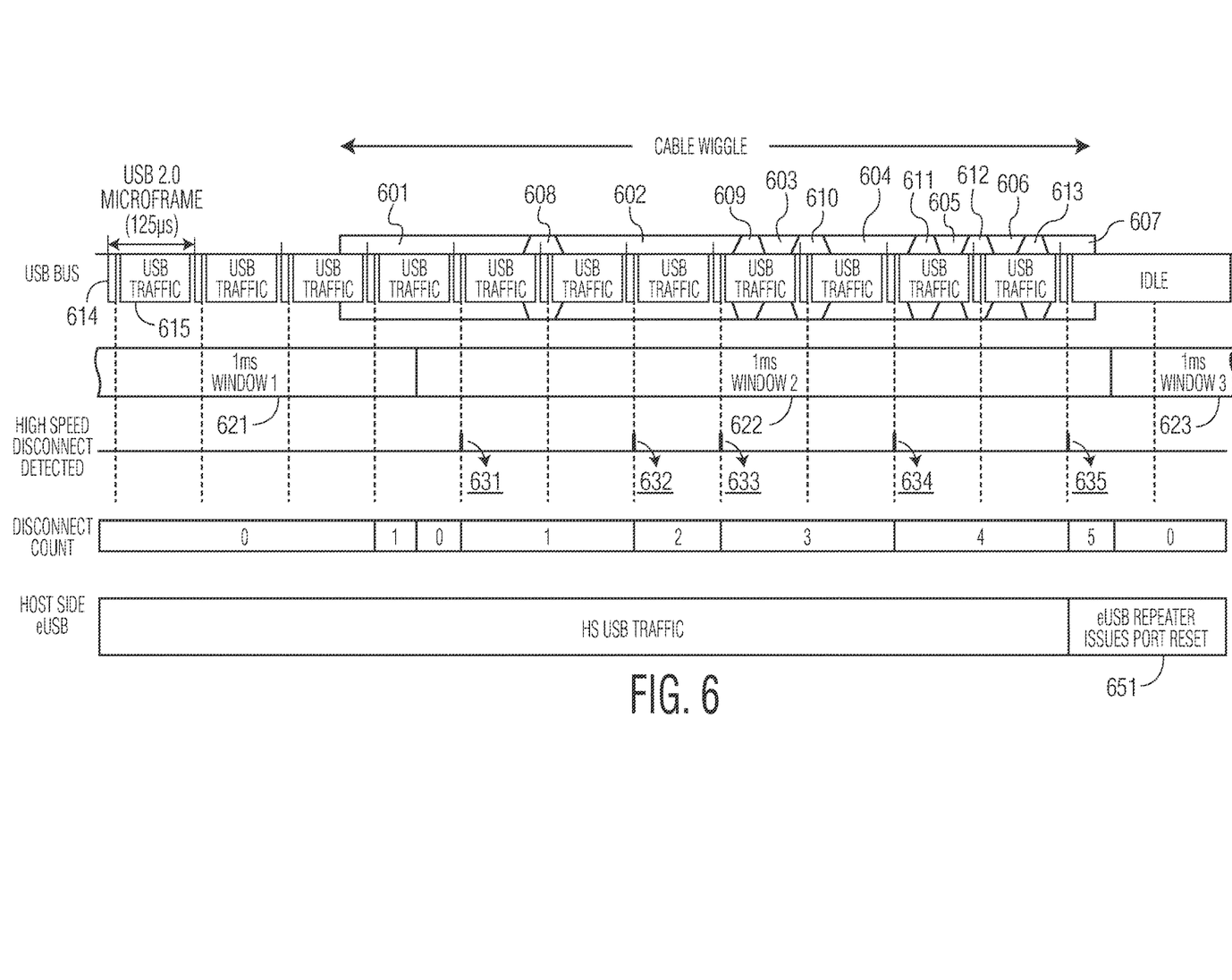

FIGS. 4, 5 and 6 are schematic diagrams illustrating the effect of sporadic device disconnect indications using methods according to the present disclosure. From one viewpoint, the methods may be considered as including filtering. FIGs. each 4, 5 and 6 show a configuration of a 1 ms window where the eUSB repeater may detect up to 4 disconnects within this window without declaring or considering the device as actually disconnected. In a 1 ms window, there are 8 USB 2.0 High Speed microframes. This would mean that up to 50% of the Start-of-Frame packets may appear to indicate disconnects and the eUSB repeater will filter, and eventually disregard, these disconnect indications. Note that the windows shown in FIGS. 4, 5 and 6 may or may not align with the USB 2.0 High Speed microframes depending on the implementation and depending on clock accuracies.

FIG. 4 shows an example embodiment where the particular alignment of the 1 ms fixed rolling window and the cable wiggling does not cause enough disconnect indications to conclude that the device is actually disconnected. FIG. 4 shows the USB bus at the top row line with a few microframes completing before the cable wiggle occurs.

Each USB 2.0 High Speed microframe consists of a Start-of-Frame packet 414 and a normal USB traffic frame 415. The period of each microframe is 125 µs. When a user wiggles a USB cable around, the cable will sometimes be 'plugged' or properly connected and sometimes be 'unplugged'. This will cause a sporadic disconnect on the USB cable. The cable (and hence the connected device) appears connected in periods 408, 409, 410, 411, 412, 413 and the cable (and hence the connected device) appears disconnected in periods 401, 402, 403, 404, 405, 406, 407.

The second row line in FIG. 4 represents a rolling window 421, 422, 423 for filtering the high speed disconnects, with a window length of 1 ms. The window is just a free running window generated from a timing reference which may not be synchronous to the USB 2.0 High Speed microframes. Herein, FIG. 4 shows a brief portion of the first 1 ms window 421, the complete second 1 ms window 422, and a brief portion of the third 1 ms window 423, that all start in the middle of a respective microframe. In some embodiments, the predetermined interval of the window length is determined by counting the frames of data, using a frame indicator occurring in each of the frame of data, until the predetermined number of frames is counted. In such embodiments the predetermined internal may be dimensionless (that is to say, it is simply a number), corresponding to a number of frames of data, either a whole number, or a rational number. In some other embodiments, the predetermined interval is a predetermined period of time. In such other embodiments, the predetermined interval may have the dimension of 'time'.

The third row line in FIG. 4 shows the high speed disconnect detection within the eUSB repeater. Note that a high speed disconnect 431 is detected right the start of the cable wiggle. This happens to occur right at the end of the first 1 ms window 421. So even though it is counted, as shown as 441 in the fourth row line in FIG. 4 that shows a count of the indicators of disconnection, since the first 1 ms window 421 only had one single indicator of disconnection event 431, the eUSB repeater resets its internal indicator of disconnection count 442 and moves to the next 1 ms window 422.

During the second 1 ms window 422, the eUSB repeater detects 4 high speed disconnects 432, 433, 434, 435 based on the cable wiggle activity in periods 401, 402, 404, which causes the corresponding indicator of disconnection events count 443, 444, 445, 446. Since the count of 4 is within the number of allowed indications of disconnection in the specified window size, the host controller is not alerted, the internal counter is reset at 447, and the eUSB repeater moves to the next 1 ms window 423.

Note that there were 5 disconnects 431, 432, 433, 434, 435 within a period of 1 ms. Even so, that didn't result in an indication to the host of disconnect, as it is not required to align the configured window with disconnect activity.

FIG. 5 shows an example in which, there are multiple, overlapping rolling windows, and the particular alignment of one of the 1 ms sliding windows and the cable wiggling causes enough disconnect indications to consider the device as actually disconnected. The example shown in FIG. 5 is the exact same 'wiggle' scenario as the previous example shown in FIG. 4 and is labelled with generally similar references to the USB bus in the first row line, except with slight difference in the window configuration. A 'sliding window' is approximated by 4 fixed rolling windows (Window A, Window B, Window C, Window D) with starting time point of each fixed rolling window being shifted from the others. The start time of window 525 in Window B is 2 microframes (250 µs) earlier than window 522 in Window A. Corresponding windows in Window C and Window D present similar 2-microframe start time shifts. The detector of disconnection count corresponding to Window B is shown—it will be appreciated that corresponding counters exist (not shown) for the Window A, Window C and Window D, each or which are reset at the start of the respective window. According to the embodiment of FIG. 5, for Window B, the 5 disconnects 531, 532, 533, 534, 535 are within the period of 1 ms and all happen in a single window 525. After the 5th detected disconnect 535, which reaches a threshold configured for the count of detected disconnect indications, the host controller is alerted to the disconnect via the eUSB repeater, which makes a determination and declares that the device has been disconnected, and issues an eUSB Port Reset 551 to the Host Controller over the local eUSB bus (bottom row line of FIG. 5). This will trigger the repeater to go to its default mode (Host State Machine disabled) and block further Host traffic. Any of Window A, Window B, Window C, or Window D reaching the threshold of detected indicators of disconnection count enables the determination and issuance of the eUSB Port Reset. It is envisioned that a more complex sliding window scheme could be used to detect a certain level of disconnects within any sliding window of the specified length. This provides a more accurate indication of disconnect activity, though at the cost of complexity. For example, a sliding window could be consisted of 8 fixed rolling windows with each shifting 1 microframe in start time. In some embodiments, 'sliding window' of this embodiment can be understood as, for each frame/microframe, whether an indicator of disconnection has occurred the predetermined number of times is determined within a most recent predetermined number of frames/microframes.

FIG. 6 shows another example where the particular alignment of the 1 ms fixed rolling window and the cable wiggling causes enough disconnect indications to consider the device as actually disconnected. The example shown in FIG. 6 is the exact same scenario as the previous example shown in FIG. 4 and is labelled with generally similar references to the USB bus in the first row line, except slightly different cable wiggling timing. The user wiggling the USB cable around causes a sporadic or intermittent disconnect on the USB cable. The cable (and hence the connected device) would appear connected in periods 608, 609, 610, 611, 612, 613 and the cable (and hence the connected device) would appear disconnected in periods 601, 602, 603, 604, 605, 606, 607. In this case, the eUSB repeater happens to detect one more disconnect during the second 1 ms window 622 compared with the example shown in FIG. 4. After the 5th detected indicator of disconnection 635 which reaches a threshold configured for the count of detected disconnect indications, the host controller is alerted to the disconnect via the eUSB repeater making the determination that the device is disconnected and issuing an eUSB Port Reset 651 to the Host Controller over the local eUSB bus (as shown in the bottom row line of FIG. 6). This will cause the repeater to go to its default mode (Host State Machine disabled) and block further Host traffic.

As discussed, the proposed solution in the present disclosure may have configurable window size in increments of the USB 2.0 High Speed microframe (125 µs) and a configurable tolerable number (or percentage) of disconnects within the window size.

Figure 7:
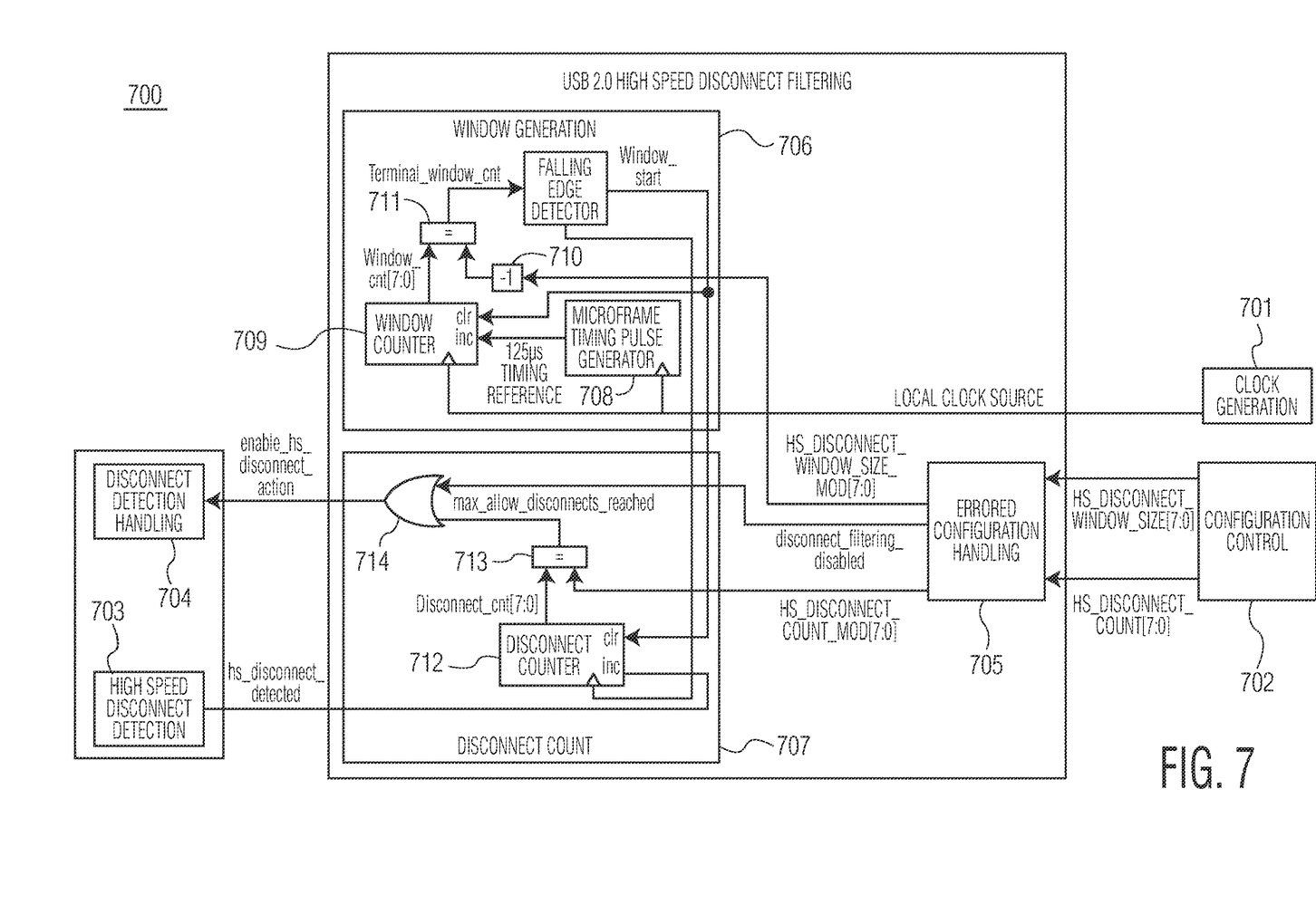
FIG. 7 is a block diagram depicting the proposed filtering solution in accordance with the present disclosure.

FIG. 7 is a block diagram depicting one or more embodiments according to the proposed solution, implemented as an apparatus 700 for detecting disconnection of a device, in accordance with the present disclosure. External logic, such as Clock Generation 701, Configuration Control 702, High Speed Disconnect Detection 703 or Disconnect Detection Handling 704, is part of a typical USB PHY.

Clock Generation 701 represents a timing reference which the proposed solution uses as part of its normal operation. The unit of Clock Generation 701 provides local clock source for the whole apparatus 700.

Configuration Control 702 represents a unit that configures parameters for operation of the apparatus 700. Configurations from the unit of Configuration Control 702 could come from a system interface such as I²C or SPI, from an internal memory device, or from a local microprocessor, etc.

Configuration Control 702 provides 8-bit data HS_DISCONNECT_WINDOW_SIZE[7:0] and 8-bit data HS_DISCONNECT_COUNT[7:0]. The embodiment of FIG. 7 described herein takes USB 2.0 High Speed microframes as an example.

HS_DISCONNECT_WINDOW_SIZE stands for the number of USB 2.0 High Speed microframes contained within a window. HS_DISCONNECT_WINDOW_SIZE defines a repeated window of duration specified as follows: window may or may not be synchronous to the USB 2.0 High Speed microframe boundaries; the variation in window length increments depends on the accuracy of the internal timing reference; an expected tolerable timing reference would be around +/−10% accurate, but could be more or less accurate depending on product needs. As an example, 8'd0 assigned to HS_DISCONNECT_WINDOW_SIZE stands for window length is N/A, wherein 8' in 8'd0 means 8-bit, and d in 8'd0 means decimal. The setting by 8'd0 could be used to disable the filtering method of the present disclosure such that a single disconnect indication triggers to decide the device as disconnected. 8'd1 assigned to HS_DISCONNECT_WINDOW_SIZE stands for window length is 125 µs. 8'dN assigned to HS_DISCONNECT_WINDOW_SIZE stands for window length equals to N*125 µs. Max window length is 31.9 ms, when N is 255.

HS_DISCONNECT_COUNT stands for the amount of high speed indicators of disconnection to be allowable within the given window length. 8'd0 assigned to HS_DISCONNECT_COUNT stands for disconnect shall be declared upon the first detection of disconnect during a High Speed Start-of-Frame packet. 8'dN (N>0) stands for N disconnects shall be allowed within the specified window length (without determining or declaring disconnection). If N+1 disconnects are detected within the window, then the device shall be determined and declared as disconnected and the proper action should be taken depending on the interface used. For example, if eUSB is used, then the repeater shall issue an eUSB Port Reset and disable repeater function and wait for further configuration from the host.

The system would select an appropriate window size (e.g., 10 ms) and also an appropriate number of acceptable high speed disconnects within this window (e.g., 53). However, the selection of the window size and the acceptable count number should also take into account the actual product used, the PHY interface involved, the requirement of accuracy, etc.

Note that with the above definition it is possible to define 'illegal' (which means invalid) combinations of window length and allowed number of high speed disconnects. For example, if the system selects a 1 ms window size and 40 as the number of allowed disconnects, while a 1 ms window lasts for only 8 microframes long, 40 disconnects is invalid, which is self-explanatory.

The apparatus 700 includes the Errored Configuration Handling 705 to implement whatever errored configuration handling as will be apparent. There are a variety of possibilities depending on the desired complexity. In this case the apparatus 700 is able to override the configuration depending on the specified window size or indications of disconnection count.

For example, if HS_DISCONNECT_COUNT was set to 8'd7, which means that 8 disconnects would have to be detected in order to notify the host of the disconnect. A window shall have a duration of at least 1 ms for which 8 USB 2.0 high speed microframes last. HS_DISCONNECT_WINDOW_SIZE should be set to at least 8'd8 which allows the window to last at least 1 ms long. Although it is possible to detect disconnect with this setting, it represents 100% of microframes appear disconnected. It is preferable to set the acceptable number of disconnects to be around 60% of the whole microframes within the defined window, nonetheless that is dependent on the system needs.

For any setting of HS_DISCONNECT_COUNT above 0, the corresponding setting of HS_DISCONNECT_WINDOW_SIZE should be at least larger than HS_DISCONNECT_COUNT. The unit of Errored Configuration Handling 705, which is configured to perform errored configuration handling, is enabled when HS_DISCONNECT_COUNT is above 0, while HS_DISCONNECT_WINDOW_SIZE is no larger than HS_DISCONNECT_COUNT. The detailed errored configuration handling mechanism is described as follows:

If (HS_DISCONNECT_COUNT=0), no change is required to be made to user settings. As soon as a high speed disconnect is detected, the host system is alerted in whichever way is appropriate for the interface used (UTMI+, ULPI, eUSB, etc.).

If (HS_DISCONNECT_COUNT>0) and (HS_DISCONNECT_WINDOW_SIZE<HS_DISCONNECT_COUNT+1) and (HS_DISCONNECT_WINDOW_SIZE=0), HS_DISCONNECT_COUNT is overridden and forced to 0.

If (HS_DISCONNECT_COUNT>0) and (HS_DISCONNECT_WINDOW_SIZE<HS_DISCONNECT_COUNT+1) and (HS_DISCONNECT_WINDOW_SIZE>0), HS_DISCONNECT_COUNT is overridden and forced to HS_DISCONNECT_WINDOW_SIZE−1.

If (HS_DISCONNECT_WINDOW_SIZE>=HS_DISCONNECT_COUNT+1), which indicates the current configuration is valid, no change is made to user settings. The proposed filtering method will proceed by using current configuration.

Referring to FIG. 7, a unit of High Speed Disconnect Detection 703 represents the normal USB 2.0 High Speed Disconnect Detection as described in the USB 2.0 spec. High Speed Disconnect Detection 703 detects the high speed disconnect during Host-to-Device Start-of-Frame packets. hs_disconnect_detected is provided from High Speed Disconnect Detection 703 to indicate the result of the detection to the present disclosure.

The unit of Disconnect Detection Handling 704 represents the portion of the USB PHY which reacts to the high speed disconnect. Whether it's a traditional UTMI+ or ULPI USB PHY or a newer eUSB repeater, each one has a specified manner in which a high speed disconnect is supposed to be handled. For example, in a host side eUSB repeater, it should react to detecting a high speed disconnect by issuing an eUSB Port Reset, as those of FIGS. 3, 5, and 6, and then disabling itself.

Embodiment of the present disclosure of the method and apparatus for detecting disconnections of a device will be described in accordance with 3 sections: Errored Configuration Handling 705, Window Generation 706 and Disconnect Count 707.

The unit of Errored Configuration Handling 705 receives HS_DISCONNECT_COUNT[7:0] and HS_DISCONNECT_WINDOW_SIZE[7:0] from the unit of Configuration Control 702, modifies the settings as described above and produces HS_DISCONNECT_COUNT_MOD[7:0] and HS_DISCONNECT_WINDOW_SIZE_MOD[7:0]. Errored Configuration Handling 705 may produce a disconnect_filtering_disabled indication if the settings are such that the method should not be used. As described, the USB PHY should act upon the very first indication of high speed disconnect if HS_DISCONNECT_COUNT=0 or HS_DISCONNECT_WINDOW_SIZE=0.

The unit of Window Generation 706 includes a Microframe Timing Pulse Generator 708, which takes the local clock source from the unit of Clock Generation 701 and divides it down to create a 125 μs timing reference. A free running Window Counter 709 receives the 125 μs timing reference, and increments once every 125 μs. As soon as counts of the Window Counter 709 hit the amount of 125 μs microframes as specified by HS_DISCONNECT_WINDOW_SIZE_MOD, the Window Counter 709 is reset and an indication is given to indicate that the window duration ends. Note that a valid HS_DISCONNECT_WINDOW_SIZE_MOD should be larger than 0 while the Window Counter 709 starts counting from 0. Thus, before a comparator 711, a '−1' operator unit 710 is added to subtract HS_DISCONNECT_WINDOW_SIZE_MOD by 1 before comparing with Window_cnt[7:0] from Window Counter 709. At the end of the window duration, the comparator 711 provides a 'Terminal_window_cnt' which presents a falling edge to be detected by a falling edge detector. As a response, the falling edge detector produces a 'Window_start' which indicates the end of one window and the start of the next.

The module of Disconnect Count 707 includes a Disconnect Counter 712 which is cleared at the start of every window and increments once for every high speed disconnect detected during a given window. Disconnect_cnt[7:0] is compared with HS_DISCONNECT_COUNT_MOD[7:0] from Errored Configuration Handling 705 by a comparator 713.

As long as the disconnection indication within the current window is less than or equal to) HS_DISCONNECT_COUNT_MOD, the apparatus disables any unit from acting upon the high speed disconnect indication. Once, or if, the number of high speed disconnection indications within a window reaches HS_DISCONNECT_COUNT_MOD, max_allow_disconnects_reached is produced from the comparator 713 and the external logic is enabled to act immediately upon the next high speed disconnection indication, which means if a further indicator of high speed disconnect is detected before the end of the current window, the external logic would act upon the disconnect. Note, considering either max_allow_disconnects_reached produced from the comparator 713 or disconnect_filtering_disabled produced from Errored Configuration Handling 705, the next one high speed disconnect would result the system to act upon the disconnect. Thus, an 'OR' gate 714 is provided to notify, through enable_hs_disconnect_action, the unit of Disconnect Detection Handling 704 to react upon the next high speed disconnect for either one of the above two conditions. According to one or more embodiments of the disclosure, the enable signal (enable_hs_disconnect_action) is provided from the 'OR' gate 714, to control the operation of Disconnect Detection Handling 704. If enabled (enable_hs_disconnect_action=true), the Disconnect Detection Handling 704 will act upon the immediate next disconnect as per the appropriate spec (UTMI+, ULPI, eUSB). If disabled (enable_hs_disconnect_action=false), the Disconnect Detection Handling 704 will not act upon the very next disconnect and shall act as if a disconnect was not detected.

Figure 8:
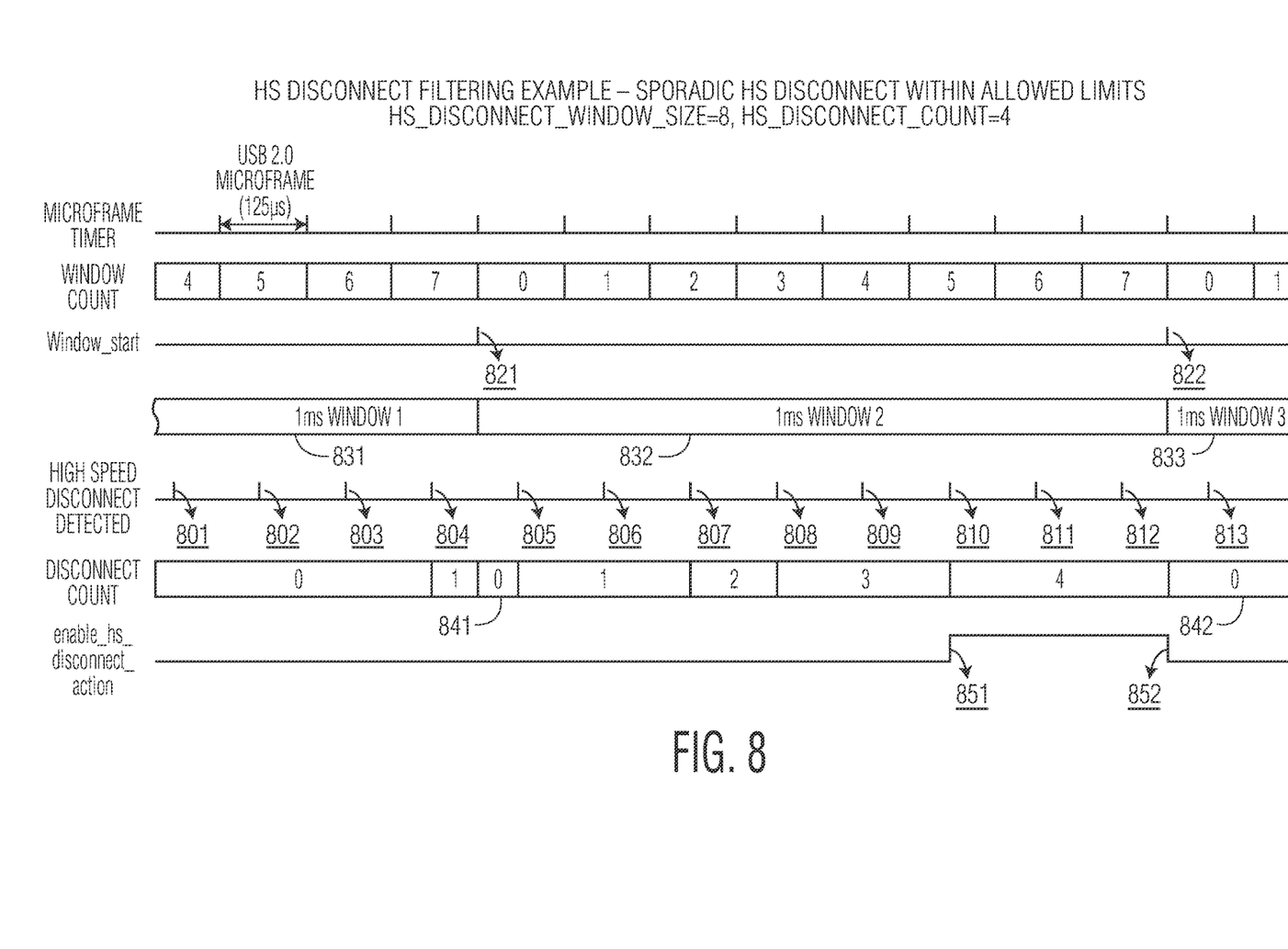
FIGS. 8 and 9 are timing diagrams depicting the operation of the method for detecting disconnection of a device with the current filtering solution.
Figure 9:
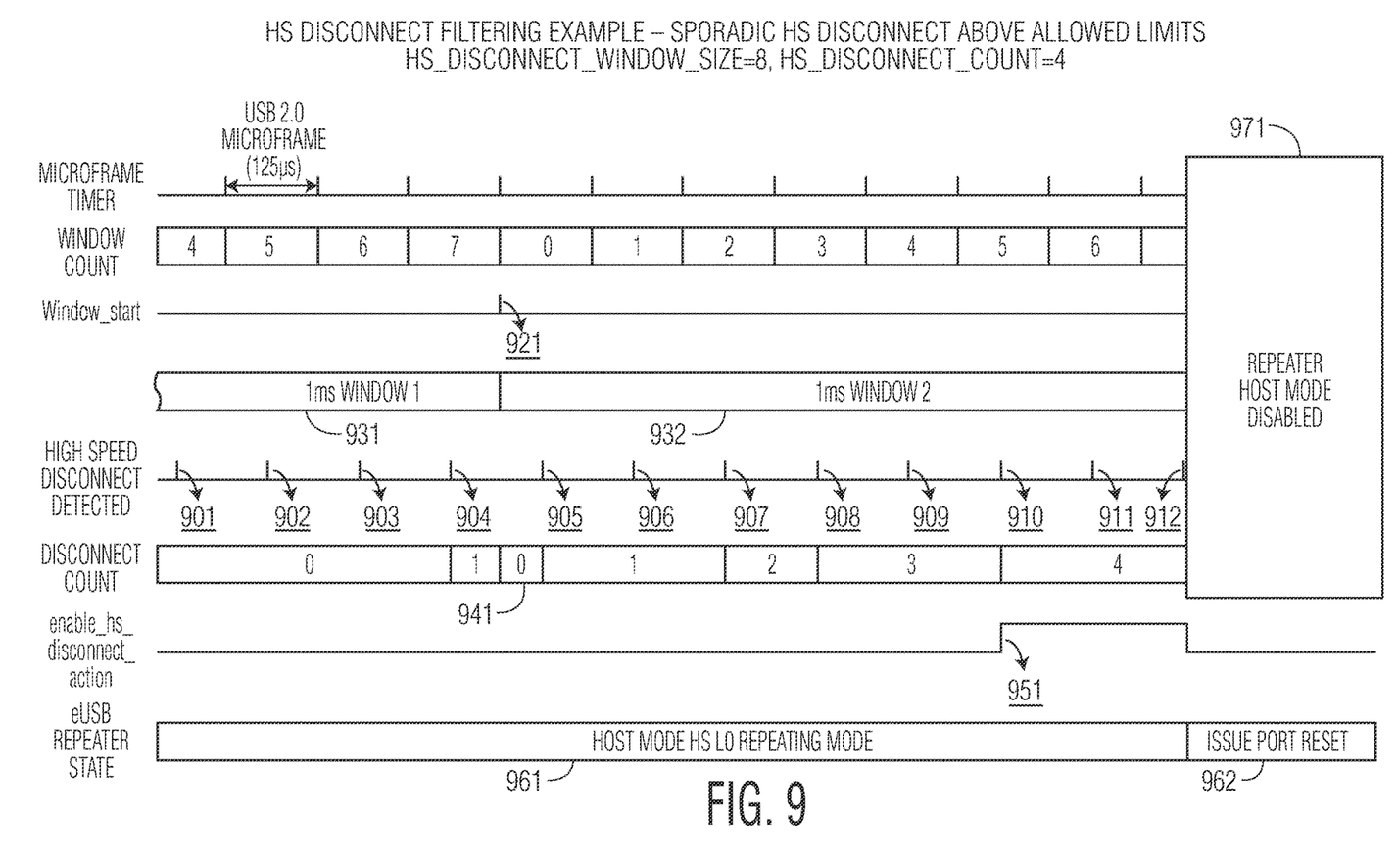

FIGS. 8 and 9 are timing diagrams depicting the operation of the method for detecting disconnection of a device with the current filtering solution.

FIG. 8 is a timing diagram which shows an example where the number of sporadic high speed disconnect indications is within the allowable limit set by the system. In the example of FIG. 8, the window size (also referred to as window length or window duration) is 1 ms (HS_DISCONNECT_WINDOW_SIZE=8 according to the embodiment of FIG. 7 described above) and the allowable number of disconnects within this window size is 4 (HS_DISCONNECT_COUNT=4). The timing shows the 125 μs timing reference, the window counter value, the Window_start indication, the current window, the high speed disconnect detection, the disconnect count, and the enable to the Disconnect Detection Handling logic to act upon the disconnect. In the example, disconnect detection performed during SOF packet but disconnect was not detected at 801, 802, 803, 806, 809, 811, 812, 813, while disconnect detection performed during SOF packet and disconnect was detected at 804, 805, 807, 808, 810. The disconnect counter is cleared (i.e., cleared to 0 at 841, 842) at the start of each window 832, 833. The example shows that during the second 1 ms window 832, 4 high speed disconnects 805, 807, 808, 810 were detected. 4 indications of disconnection are within the allowed number of disconnects (HS_DISCONNECT_COUNT=4) in the example. Therefore, after the 4th indicator of disconnection 810 is detected, the enable_hs_disconnect_action signal is asserted true at 851, such that on the next high speed disconnect detected, the USB 2.0 high speed Disconnect Detection Handling unit 704 shown in FIG. 7 would be enabled to act upon the very next detected indicator of disconnection. However, as in the example of FIG. 8, the second 1 ms window 832 ends without any more high speed indicators of disconnection being detected. At the start of the 3rd 1 ms window 833, the disconnect counter is reset at 841 and the enable_hs_disconnect_action signal is de-asserted to false at 852.

FIG. 9 is a timing diagram which shows generally the same example as that of FIG. 8 and accordingly is labelled similarly, but where the amount of sporadic high speed disconnects detected exceeds the allowed limits (HS_DISCONNECT_WINDOW_SIZE=8, HS_DISCONNECT_COUNT=4). As described above, this could be due to excessive noise, faulty cabling, or an actual disconnect (e.g., disconnect could be noisy as user wiggles cable to remove). The example in FIG. 9 shows almost the same information as the previous example in FIG. 8, except an additional eUSB Repeater State 961, 962. In alternative embodiments, other interfaces, for example UTMI+ or ULPI interface instead of an eUSB interface, are also applicable.

At the start, the eUSB repeater is in Host Mode in its High Speed L0 state 961. This is the repeating mode state where packets are conveyed upstream and downstream. In the example, disconnect detection performed during SOF packet but disconnect was not detected at 901, 902, 903, 906, 909, 911, while disconnect detection performed during SOF packet and indicators of disconnection was detected at 904, 905, 907, 908, 910, 912. The example shows that during the second 1 ms window 932, 4 high speed indicators of disconnection 905, 907, 908, 910 have been detected. After the 4th indicator of disconnection 910 is detected, the enable_hs_disconnect_action signal is asserted true at 951.

Note, in this case, a 5th indicator of disconnection 912 is detected within the second 1 ms window 932. Since USB 2.0 high speed Disconnect Detection Handling 704 is enabled to act upon any immediate next detected disconnect, the repeater immediately issues an eUSB Port Reset 962 and disables its operation right after the 5th indicator of disconnection 912 is detected. Repeater host mode is correspondingly disabled at 971. This represents that the repeater will send the Port Reset 962, but all of its other operations are substantially disabled. It would need to be reconfigured by the system in order to re-establish the USB operations again.

Figure 10:
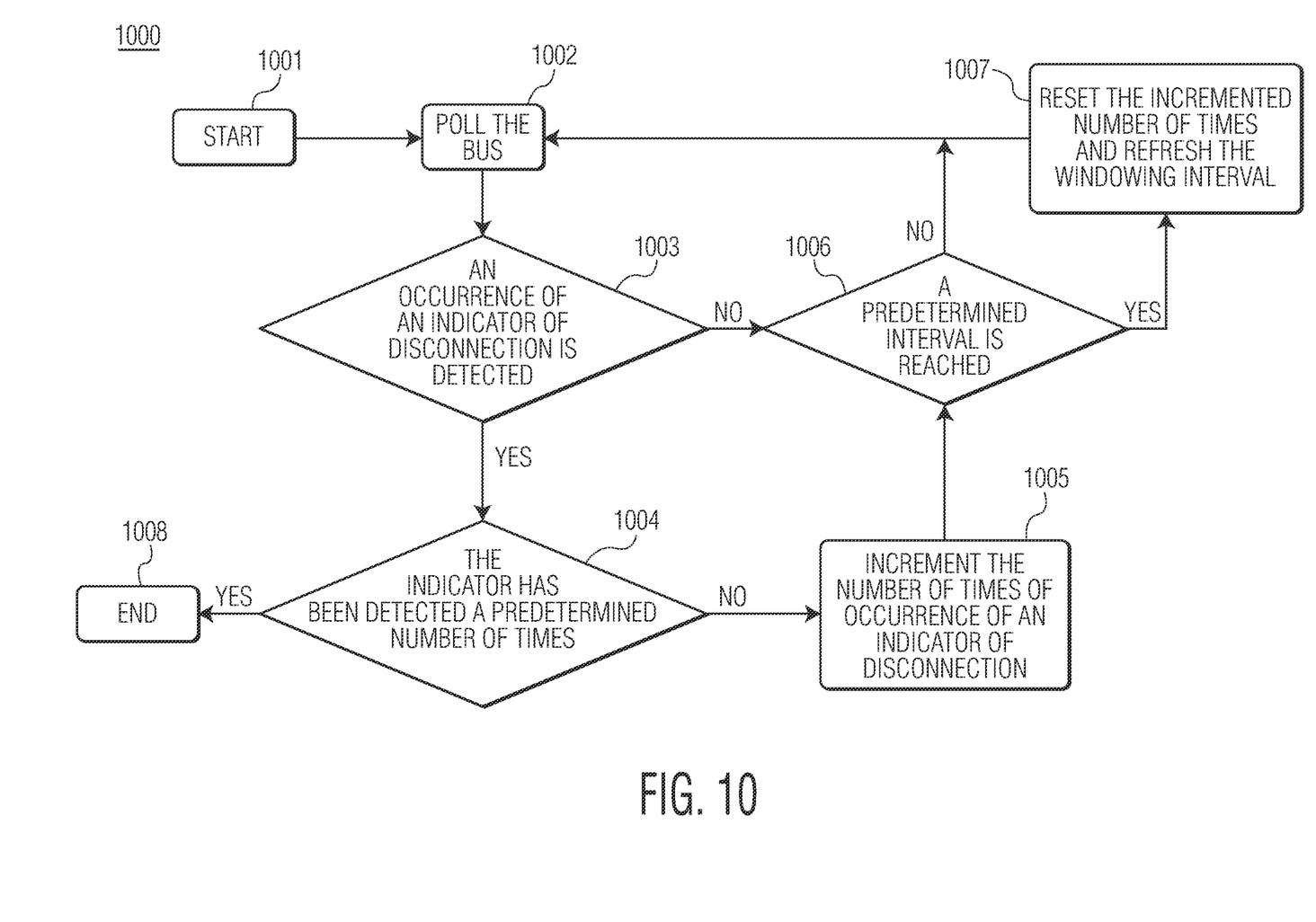
FIG. 10 is a flow chart of a method describing the mechanism for determining a disconnection of a device from a bus in accordance with one or more embodiments of the present disclosure.

FIG. 10 is a flow chart of a method 1000 depicting the mechanism for determining a disconnection of a device from a bus in accordance with an embodiment of the present disclosure. The method for determining the disconnection of a device from a bus starts at 1001. The bus is periodically polled at step 1002, to detect an occurrence of an indicator of disconnection. The bus comprises data lines for conveying frames of data. At step 1003, the occurrence of an indicator of disconnection is determined by comparing an average of a voltage on each of the data lines with a threshold voltage. When an average of a voltage on each of the data lines exceeds the threshold voltage, then at step 1004, it is determined whether the occurrence of an indicator of disconnection has been detected for a predetermined number of times (that is to say, a threshold has been reached). If the occurrence of an indicator of disconnection has been detected a predetermined number of times, a determination will be made that the device is disconnected from the bus. Then, the method 1000 will, at step 1008, disable conveying frames of data to the device in response to the determination of disconnection from the bus, and ends. If an occurrence of an indicator of disconnection is detected while the predetermined number of times has not been reached, the number of times of occurrence of an indicator of disconnection will be incremented at step 1005. During determining a disconnection of the device, the method 1000 monitors and decides whether a predetermined windowing interval is reached, at step 1006. If the predetermined windowing interval is reached, the incremented number of times of occurrence of an indicator of disconnection will be reset and the windowing interval will be refreshed to start a new window at step 1007.

The described embodiments of the present disclosure take an eUSB Repeater and its actions upon detecting a high speed disconnect as examples, however the described apparatus and method could easily be applicable to alternative embodiments of a UTMI+ or ULPI USB PHY, an integrated USB PHY, or even other PHY interface capable of data frames transmission.

The window increment was listed as 125 μs according to USB 2.0 High Speed microframe timing, but this need not be the case. Other timing references could be used which suit the needs of the system. Examples are 100 μs, 500 μs, 1 ms, etc. System noise due to various reasons (e.g., audio) may cause sporadic disconnect detections, but the system can declare a threshold for acceptable system behavior.

The proposed solution of the present disclosure has been described with reference to a specific configuration option (window size and disconnect count) and errored configuration handling, but it is envisioned that other possible configuration and error handling methods could be used. Instead of a number of incremental windows provided to create a window size, a simple window length in time could be specified. Instead of a specific number of disconnects allowed, those skilled in the art could specify a percentage. Other possibilities exist as well, as will be familiar to the skilled person, and are intended to be encompassed within the present disclosure.

The use of the terms 'a', 'an', 'the' and similar referents in the context of describing the subject matter (particularly in the context of the following claims) are to be construed to cover both the singular and the plural, unless otherwise indicated herein or clearly contradicted by context. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., 'such as') provided herein, is intended merely to better illustrate the subject matter and does not pose a limitation on the scope of the subject matter unless otherwise claimed. The use of the term 'based on' and other like phrases indicating a condition for bringing about a result, both in the claims and in the written description, is not intended to foreclose any other conditions that bring about that result. No language in the specification should be construed as indicating any non-claimed element as essential to the practice of the disclosure as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. An apparatus for determining a physical disconnection of a device from a physical bus, the apparatus comprising:
   a detection unit configured to periodically poll the physical bus, to detect an occurrence of an indicator of the physical disconnection;
   a handling unit configured to, in response to detecting the occurrence a predetermined number of times within a predetermined interval, make a determination that the device is physically disconnected from the physical bus;
   wherein the predetermined number of times of the occurrence is at least two; and
   a counter unit configured to increment, in response to each occurrence of the indicator of disconnection, to count the number of occurrences of the indicator of disconnection; and
   reset in response to the counted number of occurrences of the indicator of disconnection not reaching the predetermined number within the predetermined interval.

2. The apparatus of claim 1, wherein
the bus is configured for transferring frames of data to the device, and wherein the detection unit is configured to poll the bus at least once for each frame of data.

3. The apparatus of claim 2, wherein
the bus comprises data lines for conveying the frames of data; and
the indicator of disconnection is an average of a voltage on each of the data lines exceeding a threshold voltage.

4. The apparatus of claim 3, wherein
the threshold voltage is at least a double of the average of the voltage of the data lines for conveying the frames of data when the device is connected to the bus.

5. The apparatus of claim 4, wherein
the bus is configured to transfer data according to a protocol selected from one of the following: UTMI+, ULPI, and eUSB.

6. The apparatus of claim 3, wherein
the handling unit is further configured to disable conveying the frames of data to the device in response to determination of disconnection from the bus.

7. The apparatus of claim 2, wherein
the predetermined interval corresponds to a predetermined number of frames of data, greater than one, and the apparatus further comprising:
a window generation unit configured to determine the predetermined interval by counting the frames of data, using a frame indicator occurring in each of the frames of data, until the predetermined number of frames is counted.

8. The apparatus of claim 1, wherein
the frames of data are conveyed through the bus in a physical layer, PHY, of a digital communication protocol.

9. The apparatus of claim 1, wherein
predetermined interval is a predetermined period of time.

10. The apparatus of claim 1:
wherein the indicator of the physical disconnection is noise on the physical bus.

11. The apparatus of claim 1:
wherein the physical bus is a USB cable.

12. The apparatus of claim 1:
wherein the device is a physical device; and
wherein the indicator of the physical disconnection is a physical disconnection of the physical device from the physical bus.

13. A method for determining a physical disconnection of a device from a physical bus, the method comprising:
periodically polling the physical bus, to detect an occurrence of an indicator of the physical disconnection;
in response to detecting the occurrence a predetermined number of times within a predetermined interval, making a determination that the device is physically disconnected from the physical bus;
wherein the predetermined number of times of the occurrence is at least two;
detecting the occurrence of an indicator of disconnection a predetermined number of times within a predetermined interval comprises:
incrementing a counter in response to each occurrence of the indicator of disconnection, to count the number of occurrences of the indicator of disconnection, and
in response to the counter not reaching the predetermined number within the predetermined interval, resetting the counter.

14. The method of claim 13, wherein
the bus is configured for transferring frames of data to the device, and periodically polling the bus comprising polling the bus at least once for each frame of data.

15. The method of claim 14, wherein
the bus comprises data lines for conveying the frames of data, and
the indicator of disconnection is an average of a voltage on each of the data lines exceeding a threshold voltage.

16. The method of claim 13, wherein
the threshold voltage is at least a double of the average of the voltage on each of the data lines when conveying the frames of data when the device is connected to the bus.

17. The method of claim 16, wherein
the bus is configured to transfer data according to a protocol selected from one of the following: UTMI+, ULPI and eUSB.

18. The method of claim 15, further comprising:
disabling conveying frames of data to the device in response to determination of disconnection from the bus.

19. The method of claim 14, wherein
the predetermined interval corresponds to a predetermined number of frames of data, greater than one, and the method further comprising:
determining the predetermined interval by counting the frames of data, using a frame indicator occurring in each of the frames of data, until the predetermined number of frames is counted.

20. The method of claim 13, wherein
the frames of data are conveyed through the bus in a physical layer, PHY, of a digital communication protocol.

21. The method of claim 13, wherein
predetermined interval is a predetermined number of frames, greater than one; and
detecting the occurrence of an indicator of disconnection a predetermined number of times within a predetermined interval comprises:
for each frame, determining whether an indicator of disconnection has occurred the predetermined number of times within a most recent predetermined number of frames.

22. A method for determining a physical disconnection of a device from a physical bus, the method comprising:
periodically polling the physical bus, to detect an occurrence of an indicator of the physical disconnection; and
in response to detecting the occurrence a predetermined number of times within a predetermined interval, making a determination that the device is physically disconnected from the physical bus;
wherein the predetermined number of times of the occurrence is at least two;
wherein the predetermined interval is a predetermined number of frames, greater than one; and
wherein detecting the occurrence of an indicator of disconnection a predetermined number of times within a predetermined interval comprises:
for each frame, determining whether an indicator of disconnection has occurred the predetermined number of times within a most recent predetermined number of frames.

* * * * *